United States Patent [19]
Kim

[11] Patent Number: 5,481,313
[45] Date of Patent: Jan. 2, 1996

[54] BURST SIGNAL GENERATING CIRCUIT OF A VIDEO PROCESSING SYSTEM

[75] Inventor: Chun-sup Kim, Suwon, Rep. of Korea

[73] Assignee: Samsung Electronics Co., Ltd., Kyungki-do, Rep. of Korea

[21] Appl. No.: 352,105

[22] Filed: Nov. 30, 1994

[30] Foreign Application Priority Data

Dec. 30, 1993 [KR] Rep. of Korea .................. 1993-31321

[51] Int. Cl.$^6$ ..................................................... H04N 9/45
[52] U.S. Cl. ........................................... 348/505; 348/506
[58] Field of Search ................................ 348/505–507, 348/536, 537, 539, 549, 497–499; H04N 9/45, 9/455

[56] References Cited

U.S. PATENT DOCUMENTS

| | | | |
|---|---|---|---|
| 4,056,826 | 11/1977 | Watanabe et al. | 348/505 |
| 4,544,943 | 10/1985 | Quan | 348/505 |
| 4,930,003 | 5/1990 | Hosoya | 348/505 |
| 5,353,066 | 10/1994 | Lee | 348/505 |

FOREIGN PATENT DOCUMENTS

| | | | |
|---|---|---|---|
| 2160054 | 12/1985 | Japan | 358/19 |
| 0074489 | 4/1986 | Japan | H04N 9/465 |

Primary Examiner—James J. Groody
Assistant Examiner—Michael H. Lee
Attorney, Agent, or Firm—Sughrue, Mion, Zinn, Macpeak & Seas

[57] ABSTRACT

In a video processing system, a burst signal generating circuit receives a discontinuous burst signal and generates a continuous burst signal by using a phase locked loop. In the conventional video processing system, it is difficult to select a loop gain and loop bandwidth for generating a burst signal, since the performance characteristics of a phase locked loop are directly influenced by the presence of a sample and hold circuit in the phase locked loop. In order to solve this problem, in processing a digital video, a discontinuous burst signal is detected, and then during a burst signal, the phase locked loop operates by the discontinuous burst signal detected so that the continuous burst signal may be generated. When the burst signal is not present, the phase locked loop operates by a constant error value according to the continuous burst signal shifted 90 degrees in phase. Thereby, the continuous burst signal is generated.

3 Claims, 2 Drawing Sheets

BURST SIGNAL GENERATING CIRCUIT OF A VIDEO PROCESSING SYSTEM

BACKGROUND OF THE INVENTION

The present invention relates to a burst signal generating circuit in a video processing system which receives a discontinuous burst signal and generates a continuous burst signal by using a phase locked loop.

Generally, a video processing system processes a video signal by using a color burst signal. An example of a color burst gate circuit used to obtain a color burst signal is shown in U.S. Pat. No. 4,549,225 issued Oct. 22, 1985 to Watanabe and entitled COLOR VIDEO SIGNAL PROCESSING CIRCUIT FOR PERFORMING LEVEL CONTROL AND TIME AXIS DEVIATION COMPENSATION.

On the other hand, when a digital video signal is processed in the video processing system, the discontinuous burst signal is detected from a composite video signal and then the continuous burst signal is generated to process the video signal.

FIG. 1 is a conventional circuit diagram for generating a burst signal. This circuit diagram is composed of a burst detector 10 for inputting the composite video signal and for detecting and outputting the discontinuous burst signal by a burst gate pulse; a phase detector 12 which receives the discontinuous burst signal detected from the burst detector 10 and a given continuous burst signal, and compares a phase difference and generates an error signal corresponding to the phase difference; a loop filter 14 for integrating the error signal outputted from the phase detector 12 and for outputting a DC (direct current) value; a sample and hold part 16 for inputting the DC value integrated from the loop filter 14 and for outputting the integrated error value in a burst area of the burst gate pulse, and for holding the error value except in the burst area of the burst gate pulse; and a voltage controlled oscillator 18 for inputting a signal outputted from the sample and hold part 16 and for generating the burst signal continued by an oscillating frequency.

Referring to the operation of the circuit of FIG. 1, when the composite video signal such as 20 of FIG. 2 is inputted through an inputting terminal P1, the burst detector 10 detects the discontinuous burst signal such as 22 of FIG. 2, and then outputs the discontinuous burst signal to the phase detector 12. The phase detector 12 compares the phase difference between the discontinuous burst signal detected from the burst detector 10 and the given continuous burst signal. Then, the phase detector 12 generates the error signal corresponding to the phase difference and outputs the error signal to the loop filter 14. The loop filter 14 integrates the error signal outputted from the phase detector 12 using a filter and outputs the integrated DC value to the sample and hold part 16. The sample and hold part 16 inputs the DC value integrated from the loop filter 14. Then, the sample and hold part 16 outputs the integrated error value in the burst area of the burst gate pulse such as 24 of FIG. 2, and holds the error value in the area except the burst area of the burst gate pulse, then outputs the error value to the voltage controlled oscillator 18. The voltage controlled oscillator 18 inputs the signal outputted from the sample and hold part 16, and generates and outputs the continuous burst signal such as 26 of FIG. 2 by the oscillating frequency.

In the aforementioned conventional circuit for generating the burst signal, there is difficulty in selecting the loop gain and loop bandwidth, since the performance characteristics of the phase locked loop are directly influenced by the sample and hold part 16.

SUMMARY OF THE INVENTION

It is therefore an object of the present invention to provide a burst signal generating circuit for solving the above-mentioned problem.

It is another object of the present invention to provide a burst signal generating circuit for detecting a discontinuous burst signal and then generating a continuous burst signal, so that a stable operation is executed in a digital processing procedure in a video processing system.

It is still another object of the present invention to provide a burst signal generating circuit for generating a continuous burst signal burst-locked by using a phase locked loop in the video processing system.

The present invention for achieving the above objects is composed of a burst detecting device for inputting a composite video signal and for detecting a discontinuous burst signal by a burst gate pulse; a phase shifting device for inputting the continuous burst signal generated from the phase locked loop and for shifting the phase 90 degrees; a switching device for inputting the discontinuous burst signal shifted 90 degrees in phase by the phase shifting device, and for selecting and outputting one signal according to the burst gate pulse; and a phase locked loop for inputting the signal switching selected from the switching device and for generating and outputting the continuous burst signal continued by the oscillating frequency.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

In the following description, numerous specific details are set forth to provide a more thorough understanding of the present invention. It will be apparent, however, to one skilled in the art, that the present invention may be practiced without these specific details. In other instances well known circuits have not been described so as not to obscure the present invention.

Figure 1:
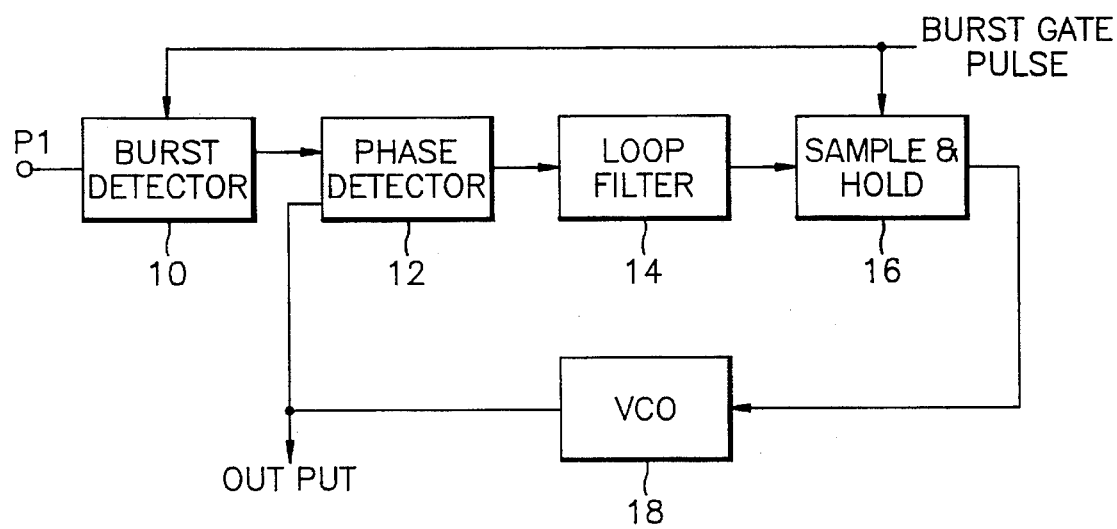
FIG. 1 is a conventional circuit diagram for generating a burst signal.
Figure 3:
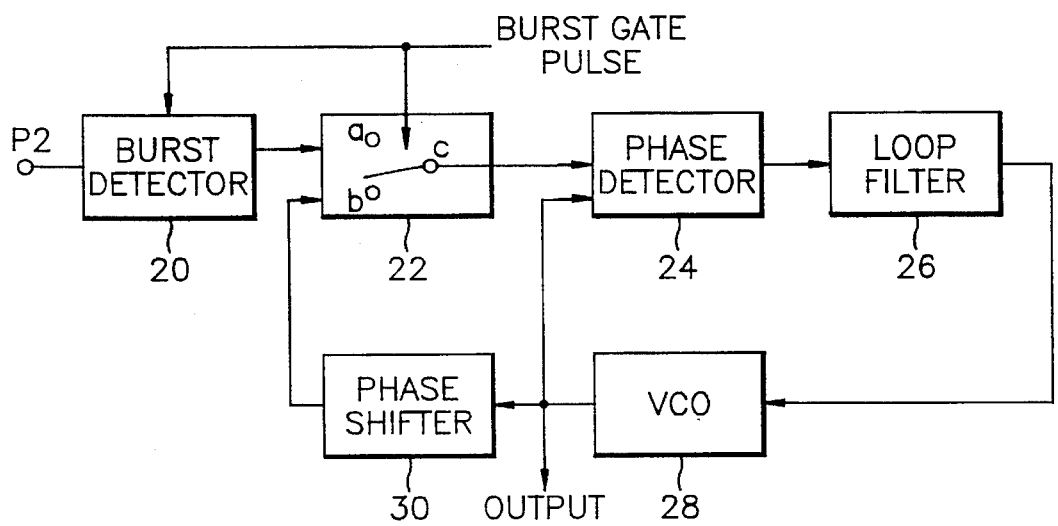
FIG. 3 is a circuit diagram for generating the burst signal according to the present invention.
Figure 2A:
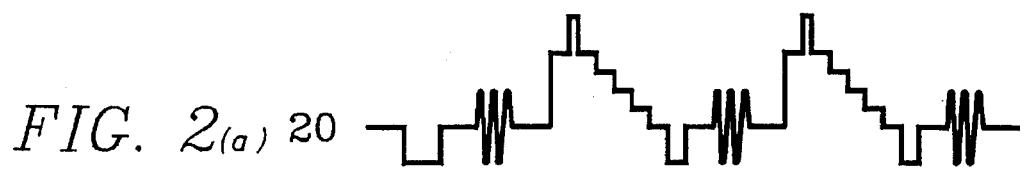
FIG. 2 is a waveform diagram of operations of respective parts shown in FIG. 1.
Figure 2B:
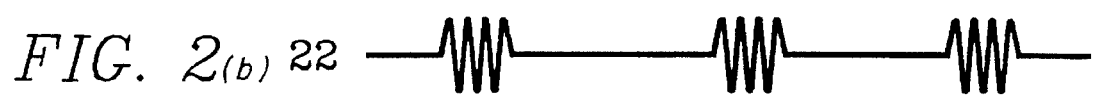
Figure 2C:
Figure 2D:
Figure 4A:
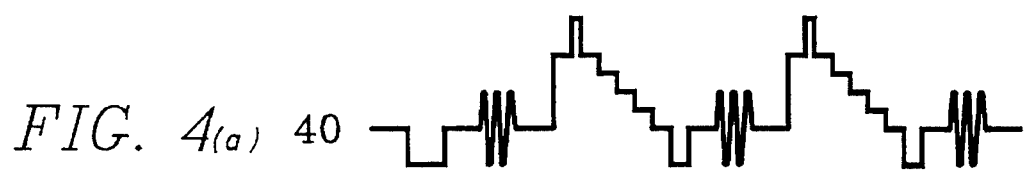
FIG. 4 is a waveform diagram for operations of respective parts shown in FIG. 3 applied to one embodiment of the present invention.
Figure 4B:
Figure 4C:
Figure 4D:

FIG. 3 is a circuit diagram of a burst signal generating circuit according to the present invention. This circuit diagram is composed of a burst detector 20 for inputting a composite video signal and for detecting a discontinuous burst signal by a burst gate pulse; a phase detector 24 for inputting the discontinuous burst signal detected from the burst detector 20 and a given continuous burst signal, for comparing a phase difference, and for generating an error signal corresponding to the phase difference; a loop filter 26 for integrating the error signal outputted from the phase detector 24 and for outputting a DC (direct current) value; a voltage controlled oscillator 28 for inputting the DC value integrated from the loop filter 26 and for generating a burst signal continued by an oscillating frequency; a phase shifter 30 for inputting the continuous burst signal generated from the voltage controlled oscillator 28, and for shifting the phase 90 degrees; and a switch 22 for inputting the discontinuous burst signal detected from the burst detector 20 and the continuous burst signal shifted 90 degrees in phase from the phase shifter 30, for selecting one signal in a burst area according to the burst gate pulse and for outputting the signal to the phase detector 24.

Referring to FIGS. 3 and 4, the preceding will be described in detail. When the composite video signal such as 40 of FIG. 4 is inputted through an input terminal P2, the burst detector 20 detects the discontinuous burst signal such as 42 of FIG. 4 by the burst gate pulse such as 44 of FIG. 4 and outputs the discontinuous burst signal to the switch 22. Using the burst gate pulse such as 44 of FIG. 4, the switch 22 is controlled and selects a signal, and then outputs the signal to the phase detector 24. In the burst area of the burst gate pulse, a common terminal (c) and a terminal (a) are connected. Therefore, the phase detector 24 compares the phase difference between the discontinuous burst signal detected from the burst detector 20 and the given continuous burst signal. Then, the phase detector 24 generates the error signal corresponding to the phase difference, and then outputs the error signal to the loop filter 26. The loop filter 26 integrates the error signal outputted from the phase detector 24 by filtering the error signal and outputs the integrated DC value to the voltage controlled oscillator 28. The voltage controlled oscillator 28 inputs the signal outputted from the loop filter 26, changes the oscillating frequency of the signal and then outputs a signal at the changed frequency. Since the frequency outputted from the voltage controlled oscillator 28 is inputted to the phase detector 24, the phase detector 24 detects and outputs the discontinuous burst signal and the error signal according to the phase difference. The outputted error signal is again applied to the voltage controlled oscillator 28 through the loop filter 26. Accordingly, the voltage controlled oscillator 28 generates a continuous burst signal such as 46 of FIG. 4 according to repeated operation of a phase locked loop as described above.

The burst signal outputted from the voltage controlled oscillator 28 is applied to the phase shifter 30. The phase shifter 30 shifts the phase of the burst signal 90 degrees and then outputs the signal. At this time, in the absence of the burst signal from the burst gate pulse such as 44 of FIG. 4, the switch 22 connects the common terminal (c) with terminal (b). The switch 22 thereby outputs the signal outputted from the phase shifter 30 to the phase detector 24 so that a constant error value may be applied to the phase locked loop, and then the continuous burst signal is generated. That is, in the area having the burst signal, the phase locked loop operates by the burst signal detected from the burst detector 20, and thereby the continuous burst signal is generated. In the area without the burst signal, the phase locked loop operates by the signal outputted from the phase shifter 30, and thereby the constant error voltage is maintained.

As mentioned above, when a digital video signal is processed in the video processing system, after detecting the discontinuous burst signal in the area having the burst signal, the phase locked loop operates by the detected discontinuous burst signal and generates the continuous burst signal. In the area without the burst signal, the phase locked looped operates by the constant error value according to the continuous burst signal shifted in phase 90 degrees, and then the continuous burst signal is generated. Thereby, the stability of the processed video signal is improved and there is no need to consider the loop gain and the loop bandwidth of the phase locked loop.

What is claimed is:

1. A circuit for generating a continuous burst signal in a video processing system, comprising:

burst detecting means for inputting a composite video signal and for detecting a discontinuous burst signal using a burst gate pulse;

phase shifting means for inputting a given continuous burst signal and for shifting a phase of said given continuous burst signal by a predetermined amount;

switching means for selecting and inputting one of the discontinuous burst signal detected from said burst detecting means and the phase-shifted given continuous burst signal obtained from said phase shifting means, according to said burst gate pulse; and a phase locked loop for inputting the selected signal from said switching means and for generating the burst signal continued by an oscillating frequency.

2. The circuit as claimed in claim 1, wherein said switching means selects the discontinuous burst signal outputted from said burst detecting means in a burst area of said burst gate pulse, and selects the phase-shifted given continuous burst signal outputted from said phase shifting means in an area of said burst gate pulse without the burst signal.

3. A circuit for generating a continuous burst signal in a video processing system, comprising:

a burst detector for inputting a composite video signal and for detecting a discontinuous burst signal using a burst gate pulse;

a phase detector for inputting the discontinuous burst signal detected from said burst detector and a given continuous burst signal, for comparing a phase difference and for generating an error signal corresponding to the phase difference;

a loop filter for integrating the error signal outputted from said phase detector and for outputting a DC value;

a voltage controlled oscillator for inputting the DC value integrated from said loop filter and for generating the burst signal continued by an oscillating frequency;

a phase shifter for inputting the continuous burst signal generated from said voltage controlled oscillator and for shifting its phase 90 degrees; and a switch for selecting one of the discontinuous burst signal detected from said burst detector and the continuous burst signal shifted 90 degrees in phase from said phase shifter according to said burst gate pulse and for outputting the selected signal to said phase detector.

* * * * *